United States Patent
Maynard

(10) Patent No.: US 7,389,511 B1
(45) Date of Patent: Jun. 17, 2008

(54) METHOD FOR PERFORMING DISTRIBUTED ADMINISTRATION

(75) Inventor: Thomas Dean Maynard, Riverton, UT (US)

(73) Assignee: Novell, Inc., Provo, UT (US)

( * ) Notice: Subject to any disclaimer, the term of this patent is extended or adjusted under 35 U.S.C. 154(b) by 843 days.

(21) Appl. No.: 10/374,960

(22) Filed: Feb. 25, 2003

(51) Int. Cl.
G06F 3/00 (2006.01)

(52) U.S. Cl. .............................. 719/310; 705/8; 713/82

(58) Field of Classification Search ................ 719/310; 705/8; 713/82
See application file for complete search history.

(56) References Cited

U.S. PATENT DOCUMENTS

| | | | |
|---|---|---|---|
| 5,627,967 A * | 5/1997 | Dauerer et al. ................. | 726/2 |
| 5,749,035 A * | 5/1998 | Ban et al. .................... | 399/316 |
| 6,058,426 A * | 5/2000 | Godwin et al. ............. | 709/229 |
| 6,460,141 B1 * | 10/2002 | Olden ........................... | 726/4 |
| 6,668,270 B1 * | 12/2003 | Simmons et al. ........... | 718/104 |
| 6,708,198 B1 * | 3/2004 | Simmons et al. ........... | 718/104 |
| 6,715,146 B1 * | 3/2004 | Simmons et al. ........... | 718/104 |
| 7,073,176 B1 * | 7/2006 | Simmons et al. ........... | 718/104 |
| 7,080,077 B2 * | 7/2006 | Ramamurthy et al. ......... | 707/9 |

OTHER PUBLICATIONS

Novell Portal Services User Communities at www.novell.com/documentation/lg/nps15/configure/data/af6p0s5.html, p. 1.
Community Types at www.novell.com/documentation/lg/nps15/configure/data/aflnez9.html, p. 1.
Community Gadgets at www.novell.com/documentation/lg/nps15/configure/data/ae000nq.html, pp. 1-4.
Setting Up Communities at www.novell.com/documentation/lg/nps15/configure/data/aece52b.html, pp. 1-4.
Sun One Identity Server-Overview at web.archive.org/web/20030417162322/wwws.sun.com/software/products, pp. 1-4.
Sun One Identity Server-Data Sheet at web.archive.org/web/20030608123351/wwws.sun.com/software/produ..., pp. 1-10.
The Wiring Company at www.thewiringco.com/products_b2b.html, 3 pages.

* cited by examiner

Primary Examiner—Meng-Ai An
Assistant Examiner—Lechi Truong
(74) Attorney, Agent, or Firm—Marger Johnson & McCollom, P.C.

(57) ABSTRACT

A master defines properties for a resource. The master assigns the properties to an owner. The owner associates the properties to an administrator object, the administrator object being an administrator of a company. The administrator can then associate the property to other objects associated with the company, thereby granting other company users access to the resource property.

9 Claims, 11 Drawing Sheets

METHOD FOR PERFORMING DISTRIBUTED ADMINISTRATION

FIELD OF THE INVENTION

This invention pertains to access control, and more particularly to distributing assignment of access controls for resources.

BACKGROUND OF THE INVENTION

In the past, those responsible for a resource were responsible for controlling access to the resource. For example, if a user purchased the right to view a particular web site, either the maintainer of the web site or the party who sold the right is responsible for changing access to the web site, to allow the user to view the web site.

While this approach can work for individual users, it has limitations in the corporate environment. In the business world, the purchaser of a product tends to be the corporation, rather than an individual employee within the corporation. In addition, businesses tend to purchase numerous licenses for their employees, as typically more than one employee will use the product. Having someone associated with the company selling the product grant access to the resource is inconvenient and complicated. Such a person does not know who should be granted access and who should be denied access. Further, such a person has no way to know when access rights should be changed as company employees join and leave the company.

Even though having someone associated with the company selling the product control access rights works better when managing individual users, even here the policy has problems. Often, the person managing the resource has no contact with the person selling licenses to the resource. This means that, at the very least, there is a delay from when the seller informs the manager of the resource that a new user needs to be granted access.

A need remains for a way to allow distributed administration of resources that addresses these and other problems associated with the prior art.

SUMMARY OF THE INVENTION

The invention is a method and apparatus for performing distributed administration of resources. A master of the resource defines a property of the resource, and assigns the rights to the property to an owner of the resource. The owner of the resource assigns the property to users and to companies. Where a company is assigned the property, an administrator for the company has the authority to assign the property to users within the company.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
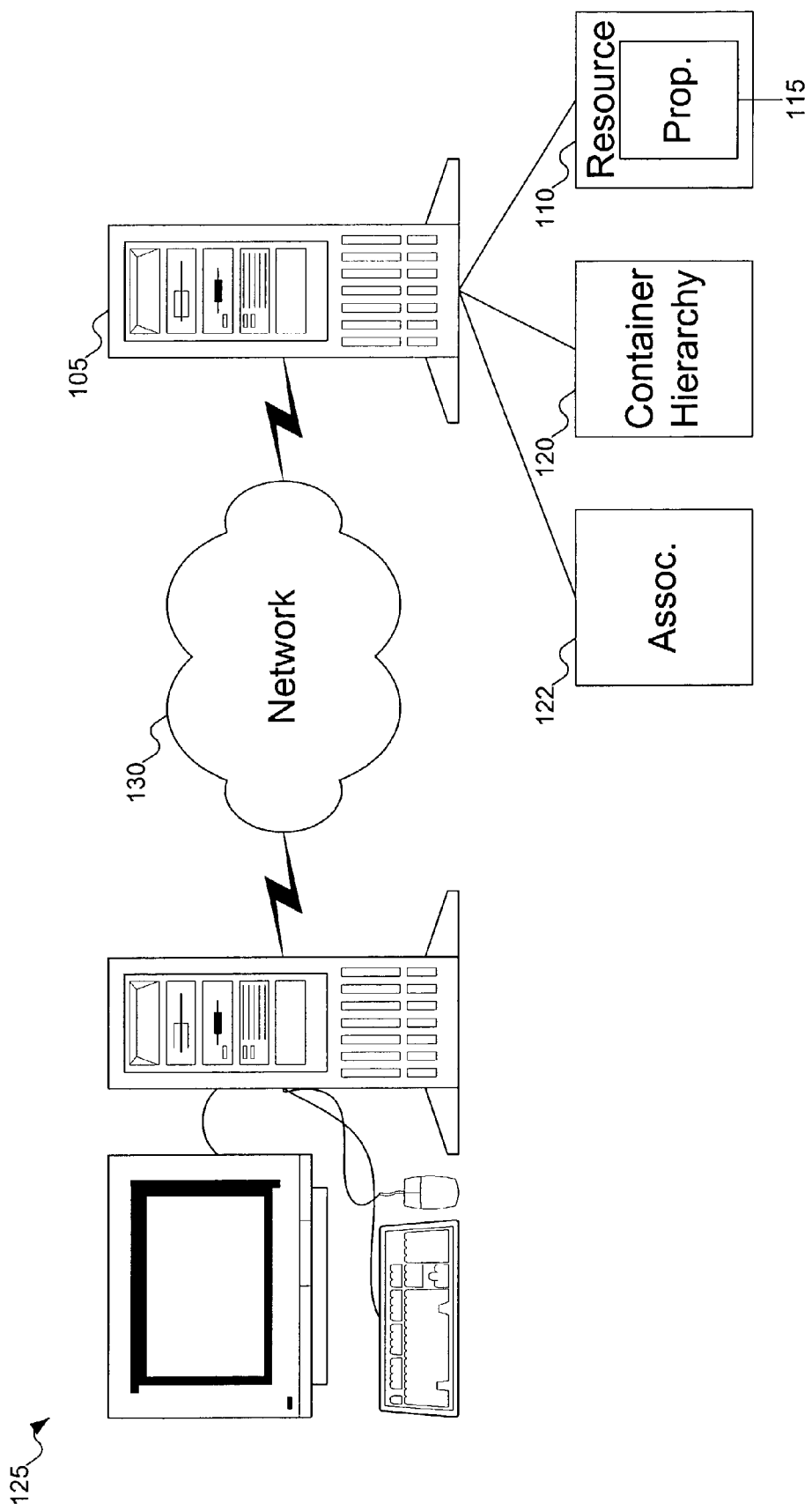
FIG. 1 shows a computer configured to enable distributed administration of a resource, according to an embodiment of the invention.

FIG. 1 shows a computer configured to enable distributed administration of a resource, according to an embodiment of the invention. In FIG. 1, computer 105 includes resource 110. Resource 110 can be any type of computer-accessible resource. For example, resource 110 can be a document describing the licensing of a product. Or resource 110 can be on-line technical support for a product. A person skilled in the art will recognize other possible forms resource 110 can take.

Associated with resource 110 is property 115. Property 115 is a property that can be defined for the resource. For example, if resource 110 is a license document, property 115 can be the right to view a read-only version of the document, or the right to download the resource. Or, if resource 110 is on-line technical support, property 115 can be the right to access the frequently accessed questions list, the right to communicate with a technical support agent by e-mail, or the right to chat on-line in real-time with a technical support agent. A person skilled in the art will recognize other possible properties that can be associated with different types of resources.

Computer 105 includes container hierarchy 120. Container hierarchy 120 is used to store the hierarchy of objects (user objects, containers, and groups), and is discussed further with reference to FIG. 2 below.

Finally, computer 105 includes associator 122. Associator 122 is used to associate objects with other objects and/or properties of resources. (Another term that can be used instead of "associating" is "binding": for example, a property of a resource can be bound to an object. Other terms used less frequently are "granting" or "giving," used to describe the process without overly repetitive use of the same term.) Associator 122 is described further with reference to FIG. 4 below.

In FIG. 1, computer 105 is shown including just the computer itself, without any additional components. Such components can include a monitor, keyboard, and mouse. A person skilled in the art will recognize that other components can be included with computer 105: for example, other input/output devices, such as a printer. In addition, FIG. 1 does not show the conventional internal components of computer 105: e.g., a central processing unit, memory, file system, etc. Finally, although computer 105 typically operates as a server in a client-server relationship, a person skilled in the art will recognize that computer 105 is not limited to being a server, and might be, for example, a computer in a peer-to-peer network.

FIG. 1 also shows client computer 125 accessing computer 105 via network 130. Client computer 125 can be the computer of a user who is associated with property 115 of resource 110. For example, client computer 125 can belong to a user who has purchased a product that entitles the user to access the property of the resource. Or client computer 125 can belong to an employee of a company that purchased the product, and the employee is to be granted permission to access the property of the resource. How the user is determined to have access to the property of the resource is described further with reference to FIGS. 4-9B below. In addition, although the term "client" is used to describe client computer 125, a person skilled in the art will recognize that client computer 125 does not have to be in a client-server relationship with computer 105.

Figure 2:
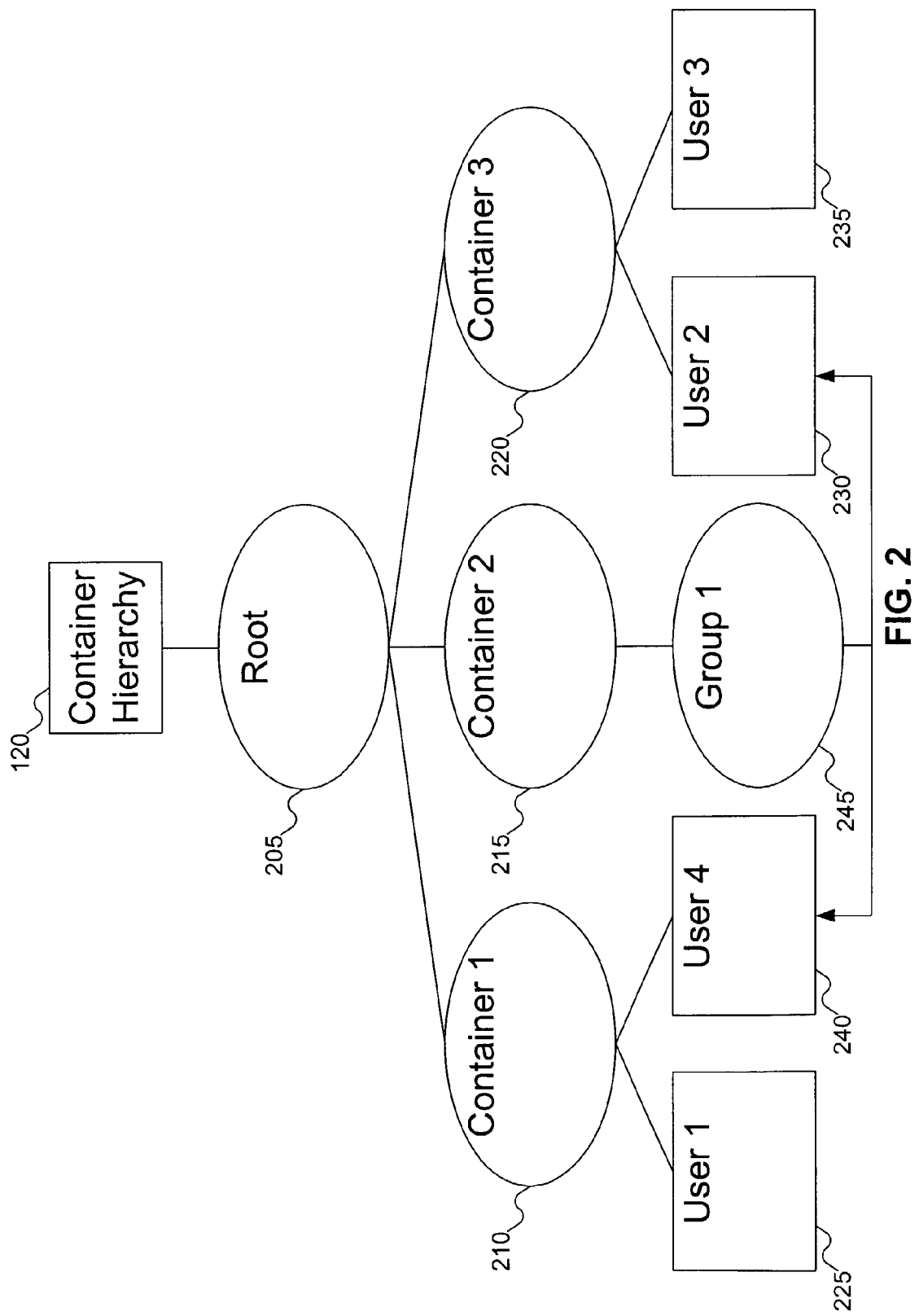
FIG. 2 shows an example of the structure of a container hierarchy in the computer of FIG. 1, according to an embodiment of the invention.

FIG. 2 shows an example of the structure of the container hierarchy of FIG. 1, according to an embodiment of the invention. In FIG. 2, root 205 is the root of a container hierarchy. There are three objects below root 205: container 1 (210), container 2 (215), and container 3 (220). Each of containers 1 (210), 2 (215), and 3 (220) can further contain objects in the container hierarchy (be they other containers, user objects, groups, or other types of objects). The containers can be organized in any desired fashion and to any purpose. A person skilled in the art will recognize that there are numerous variations on FIG. 2. For example, there can be fewer or more than three containers below root 205.

Containers 1 (210) and 3 (220) are expanded, and show directory entries for four users. Directory entry 225 is for user 1, directory entry 230 is for user 2, and directory entry 235 is for user 3, and directory entry 240 is for user 4. Although FIG. 2 shows two users in each of containers 1 (210) and 3 (220), a person skilled in the art will recognize that there can be any number of users in a container. In addition, a person skilled in the art will recognize that there can be more than three levels in container hierarchy 120.

FIG. 2 also shows group 1 (directory entry 245). A group represents a group of users not contained in a container in container hierarchy 120. Although group 1 (directory entry 245) contains two members, a person skilled in the art will recognize that a group can have any number of members.

FIG. 2 shows group 1 (directory entry 245) as having direct membership by users. A person skilled in the art will recognize that membership in a group can be direct membership, or indirect membership based upon some criteria. The criteria can be anything, such as "users whose first names begin with the letter A," or "users who are managers," for example. Whether group membership is direct or indirect does not have any effect on the ability of group members to access properties of resources as described below with reference to FIG. 3, either directly or indirectly.

Figure 3:
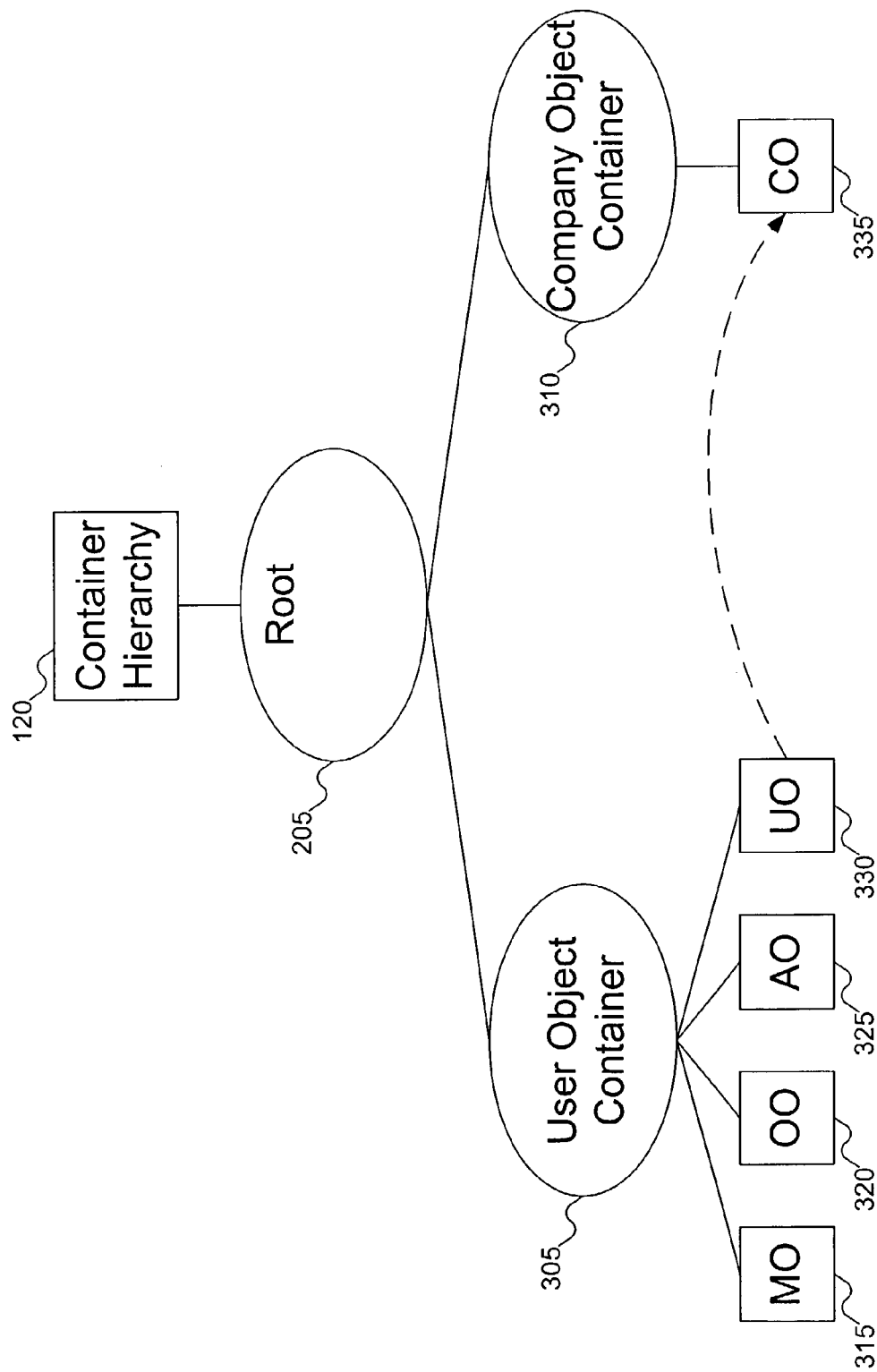
FIG. 3 shows various objects in the container hierarchy of FIG. 2, according to an embodiment of the invention.

In FIG. 2, container hierarchy 120 was shown using an arbitrary structure. One possible structure that can be used to sort objects in container hierarchy 120 is to store user objects (that is, objects that represent users) in one container, and to store company objects (that is, objects that represent companies) in another container. Such a structure is shown in FIG. 3. Throughout the remainder of this description, it is assumed that user objects are stored in user object container 305, and company objects are stored in company object container 310. Nevertheless, a person skilled in the art will recognize that this division of objects into two containers is arbitrary, and the description of how to associate properties with objects is not limited to objects stored in user object container 305 and company object container 310, if there are objects that can play the necessary roles.

As mentioned earlier, user object container 305 stores the objects that represent users. FIG. 3 shows four user objects: master object 315, owner object 320, administrator object 325, and user object 330. The term "user object," when in reference to the object identified by reference number 330, does not refer to user objects in general, but rather to objects that are users of resources. It is understood that context in this document will distinguish between objects that represent users of any variety within container hierarchy 120 and objects that identify users permitted to access resources.

Master object 315 represents a master of the resource. A master is a user who is capable of defining properties for resources. To help distinguish the master from the master object, the master is sometimes referred to as the master user. For example, if the resource is a document describing a license for a product, the master is the user who defines properties on the license to include viewing a read-only copy and downloading a copy to a client computer. Or if the resource is on-line technical support, the master is the user who defines properties of technical support as including reviewing the frequently asked questions list, e-mail technical support, and real-time chat with a technical support agent.

Owner object 320 represents an owner of the resource. An owner is a user who is capable of associating a property of a resource with an object in the container hierarchy. To help distinguish the owner from the owner object, the owner is sometimes referred to as the owner user. And in the special case where the object in the container hierarchy is a company object (such as company object 335), the owner also associates the right to associate the property with an administrator object in the container hierarchy.

This last statement might be confusing. A person skilled in the art will recognize that the owner is responsible for associating the property with objects in the container hierarchy. But where the object represents a company, there is an additional level of indirection. Companies do not act: people (i.e., employees) act. Thus, while associating the property with the company intuitively makes sense, the property actually needs to be associated with the users who act on behalf of the company. But as employees come and go, the actual list of users who should be associated with the property changes. Rather than having the owner be responsible for changing which employee-users, this role can be assigned to an administrator. Thus, the owner is capable of giving another user (specifically, an administrator of a company represented by company object 335) the right to associate the property to other users. The owner of the resource can be said to have the capability of associating the "meta-property" (that is, the right to associate the property to other objects) with administrator objects. To say this yet another way, the owner of the resource is associated with the right to associate the right to associate the property to other objects.

Administrator object 325 represents an administrator of the resource. An administrator is a user capable of associating a property of a resource with an object in the container hierarchy. To help distinguish the administrator from the owner object, the administrator is sometimes referred to as the administrator user. But unlike owner object 320, administrator object 325 has two distinct limitations. First, administrator object 320 must be an administrator of a company with which the property is associated. Second, administrator object 320 can only associate the property to other objects that are associated with the company object (e.g., employees of the company).

Finally, user object 330 is an object representing an individual. User object can be an independent user (e.g., a user who has personally purchased a product), or can be an employee of a company that has purchased a product. In FIG. 3, user object 330 is an employee of a company represented by company object 335, as shown by the dashed line connecting user object 330 and company object 335. Finally, as should be apparent at this point, company object 335 is an object representing a company.

The reason for separating the roles of master, owner, administrator, and user can be explained, now that the various objects themselves have been defined. As explained above, the master defines the properties of the resource. Typically, the master of the resource is a technical user. Given a technical background, the master is often the user in the best position to define the different properties of a resource. But typically, the right to use the property of the resource is not managed by the master, but rather by another (e.g., a sales representative). If the master were responsible for associating the property to objects in container hierarchy 120, then the master would need to know about any new objects with which the property ought to be associated. This would involve either having the master be the one offering the property to a new object, or the offeror communicate a new object to be associated with the property to the master. Either process has inefficiencies.

By having the owner be responsible for associating the property with objects in container hierarchy 120, the master need not concern himself with the task of associating the property with objects, and can focus on managing the resource itself. The owner of the resource can then be the one offering the property to users/companies. Thus, for example, if a sales representative sells a product to a company, and because of the sale the company is entitled to access technical support, the sales representative can associate the appropriate technical support properties to the company object, with the sales representative acting as an owner of the property.

Where the purchasing entity is a company, there might be many different users who should have access to the property of the resource. For example, if the resource is technical support, there might be many different users who should be able to access technical support. But the specific list of users who should have access can change over time, as new employees are added to the corporate payroll, or old employees leave the company. Having to keep either the master or the owner of the resource in the loop of managing the property is another source of inefficiency. The administrator of the resource addresses this inefficiency. When the property is associated with the company object, a particular user within the company can be identified to the owner of the resource. The owner can then make this user the administrator of the property within the company. This frees the master and owner from the day-to-day management of which users within the company are permitted to access the property of the resource. This is why the owner of the resource can be said to have the capability of associating the "meta-property" (that is, the right to associate the property to other objects) with administrator objects. To say this another way, the owner of the resource is associated with the right to associate the right to associate the property to other objects.

Although FIG. 3 shows only one each of master object 315, owner object 330, administrator object 325, user object 330, and company object 335, a person skilled in the art will recognize that there are no quantitative limits on the number of objects who can participate in the various roles. There can be many masters of the resource, each responsible for managing resource properties. There can be many owners of the resource, each able to associate the properties of the resource with other objects. (Different owners of the resource can also be responsible for subsets of the properties of the resource, so that one owner can have the capability of associating a property with an object that another owner cannot associate with objects.) There can be many administrators of the resource, both across different companies and within a single company. And there can be many different users associated with a single company.

Figure 4:
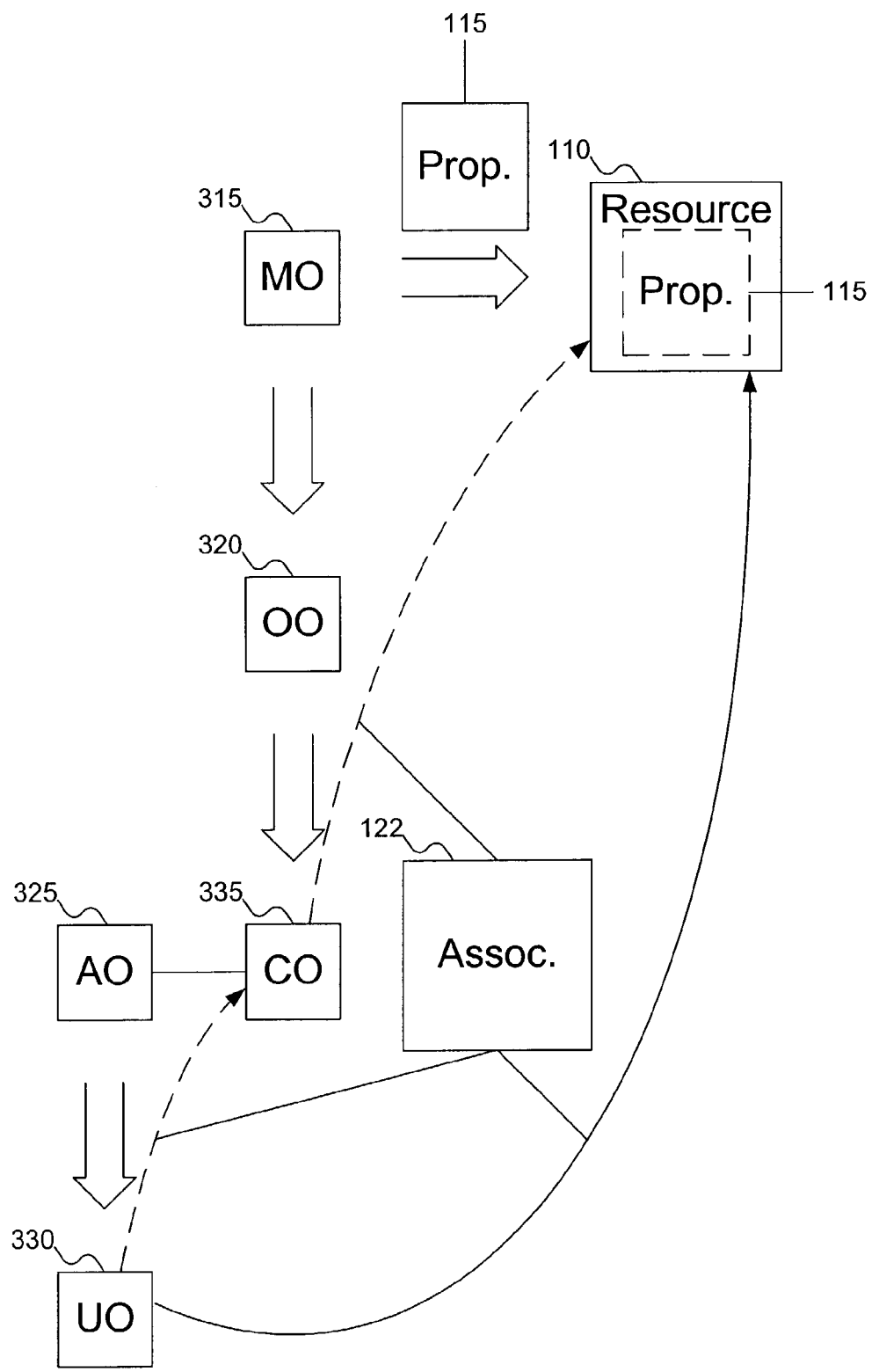
FIG. 4 shows the objects of FIG. 3 in the container hierarchy of FIG. 2 operating on a property of the resource, according to an embodiment of the invention.

FIG. 4 shows the objects of FIG. 3 in the container hierarchy of FIG. 2 operating on a property of the resource, according to an embodiment of the invention. In FIG. 4, master object 315 defines property 115, which is associated with resource 110. Master object 315 then associates the right to associate the property with other objects to owner object 320. Owner object 320 then associates the property with company object 335, which has associated administrator object 325. This means that administrator object 325 has the right to associate the property with user objects (such as user object 330) that are associated with company object 335.

To associate the various objects with the property, associator 122 is used. That is, master object 315 uses associator 122 to associate owner object 320 with the ability to associate property 115 with other objects. (FIG. 4 does not show associator 122 being used to create the association to owner object 320.) And owner object 320 and administrator object 325 use associator 122 to associate the property with objects (specifically, company object 335 and user object 330, respectively).

The reader might still be confused by which objects have which rights. The master object, as master of the resource, gives the owner of the resource the right to associate the property with other objects. This includes both associating the property with user objects and granting administrator objects the right to associate the property with other user objects. (The right to (associate the right to (associate the property with objects)) can be called the "meta-meta-property.") The owner associates the property with objects and, for company objects, grants an administrator the right to associate the property with other objects. The right to (associate the property with objects) can be called the "meta-property.") The administrator can only associate the property with other object. Thus, the rights can be said to nest. A tabular form might be useful for parsing these rights, as shown in Table 1.

TABLE 1

3. associating the right to (associate the right to (associate the property with the object))
2. associating the right to (associate the property with the object)
1. associating the property with the object Level 1 of Table 1 is the lowest level. Level 1 is carried out by administrators (and owners, to the extent the property is directly associated with individual users). Level 2 is the "meta-property" level, and is carried out by owners when they assign the rights to administrators (and by masters when they assign the rights to owners). Level 3 is the "meta-meta-property" level, and is reserved to masters (when they grant owners the right to grant rights to administrators).

As will be explained below with reference to FIGS. 5 and 7, there are different ways of associating the property with user object 330. It is possible to directly associate the property with user object 330 (as shown by the solid line to resource 110). Alternatively, the property can be associated with company object 335 (as shown by the dashed line to resource 110), which can maintain a list of user objects permitted to access the property (shown by the dashed line to company object 335).

Figure 5:
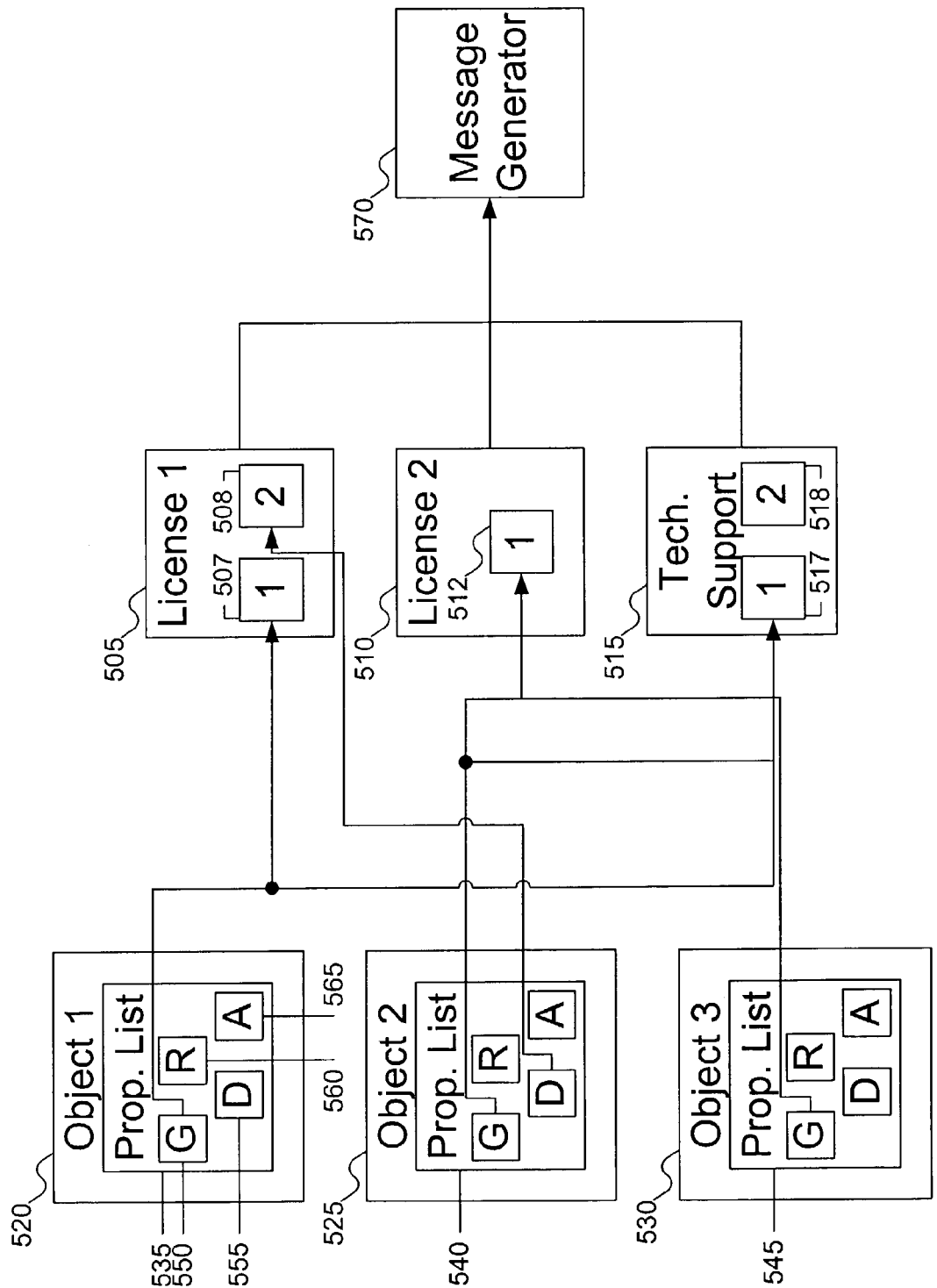
FIG. 5 shows objects in the container hierarchy of FIG. 2 accessing properties of resources via the computer of FIG. 1, according to an embodiment of the invention.

FIG. 5 shows objects in the container hierarchy of FIG. 2 accessing properties of resources via the computer of FIG. 1, according to an embodiment of the invention. In FIG. 5, three resources are shown: license 505, license 510, and technical support 515. Each resource has properties associated with the resource, identified as properties 507, 508, 512, 517, and 518. Three objects 520, 525, and 530 are also shown. Each user object has an associated property list, such as property lists 535, 540, and 545. The property lists store lists of properties associated with the objects. Each property list has four sub-lists: granted properties 550, denied properties 555, requested properties 560, and associated properties 565. Each of these sub-lists will be explained in turn.

Granted properties sub-list 550 lists the properties to which the object has been granted access. For example, object 520 has been granted access to property 507 of license 505 and property 517 of technical support 515. Denied properties sub-list 555 lists the properties to which the object has been denied access. For example, object 525 has been denied access to property 508 of license 505. Requested properties sub-list 560 lists the properties to which the object has requested access, but to which access has not yet been granted or denied. (No object in FIG. 5 is shown as having requested a property of the available resources.)

The last sub-list is associated-properties sub-list 565. A property is listed in associated-property sub-list 565 when the object has voluntarily associated itself with the property. (No object in FIG. 5 is shown as having voluntarily associated itself with a property of the available resources.) An object can voluntarily associate itself with the property when, for example, the administrator does not want the burden of managing for himself all of the users who want access to a particular property of a particular resource. Rather than having the administrator individually associating the property with the appropriate user objects, users can voluntarily associate their user objects with the property. This grants the users limited access to the property (for example, instead of being able to download a document describing a license for a product, the user can only view a read-only copy of the document). This reduces the burden on the administrator, who only has to grant access to the property to users who are to be granted full access.

All of the resources (and thus all of the properties) are connected to message generator 570. Message generator 570 generates messages, informing the users associated with various objects about associations with resource properties. For example, when an administrator grants an object access to a resource property, message generator 570 sends a message to the user represented by user object 330, informing him of the property grant. When a user requests access to a property to which the user has not been granted access, message generator 570 sends a message to the administrator, informing him of the interest of the user. (Message generator 570 can determine which administrator the message is destined for by tracing the user to a company in the container hierarchy, and from the company to an assigned administrator.) Message generator 570 can also send messages, alerting the master, owner, or administrator of unauthorized attempts to access properties.

Figure 6:
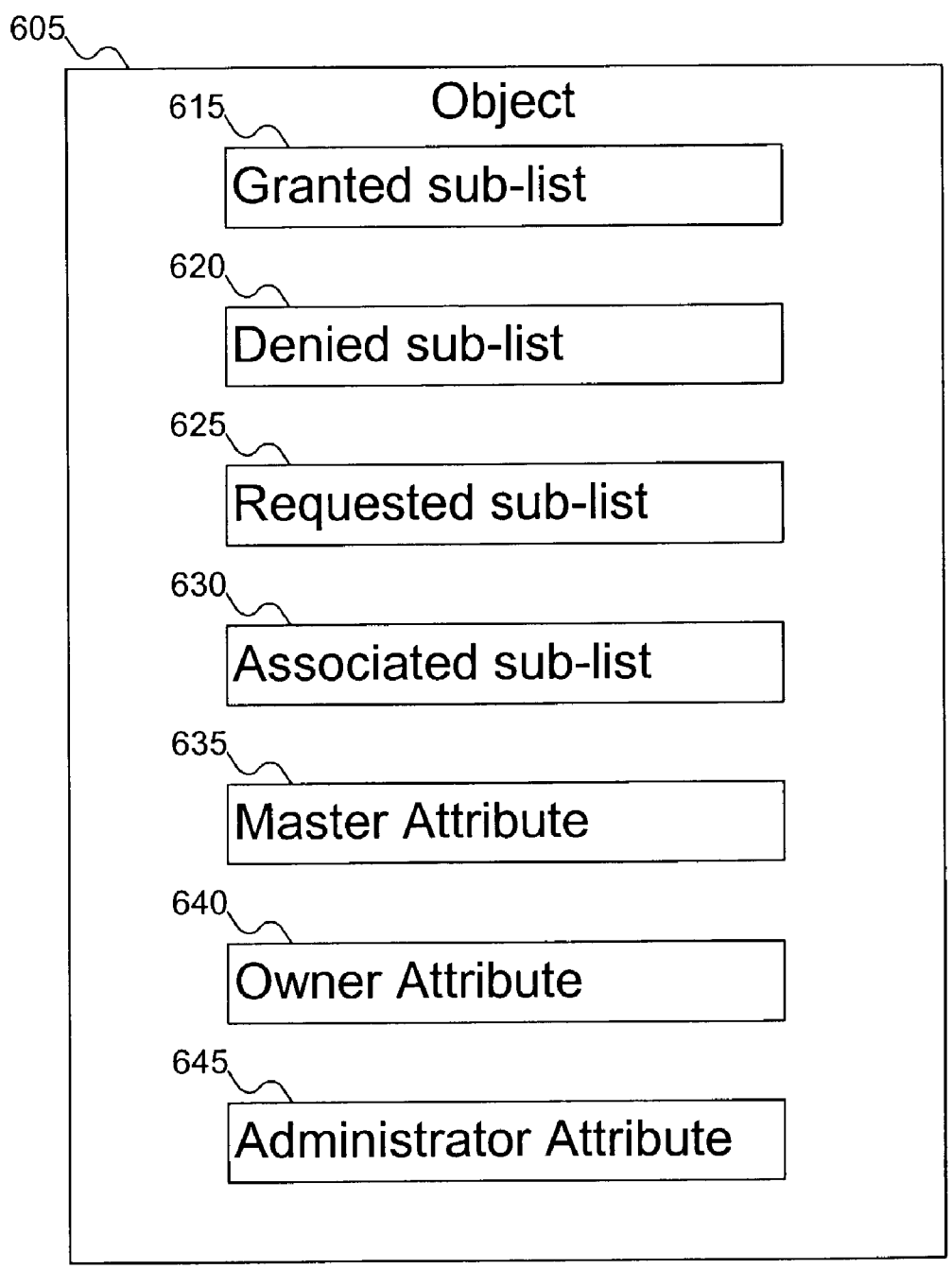
FIG. 6 shows attributes associated with an object in the container hierarchy of FIG. 2, according to an embodiment of the invention.

Although property lists 535, 540, and 545 show only granted, denied, requested, and associated sub-lists, other attributes can be included within the objects. FIG. 6 shows some of these other attributes. In FIG. 6, object 605 is shown with granted, denied, requested, and associated sub-lists 615-630, respectively. Object 605 also includes master, owner, and administrator attributes 635-645, respectively. When values are assigned to these attributes, the user represented by the object is given the appropriate control over the resource/property. For example, if object 605 has the administrator attribute given a value corresponding to a property of a resource, this means that, for the company with which object 605 is associated, object 605 can associate the property with other user objects associated with his company object.

Figure 7:
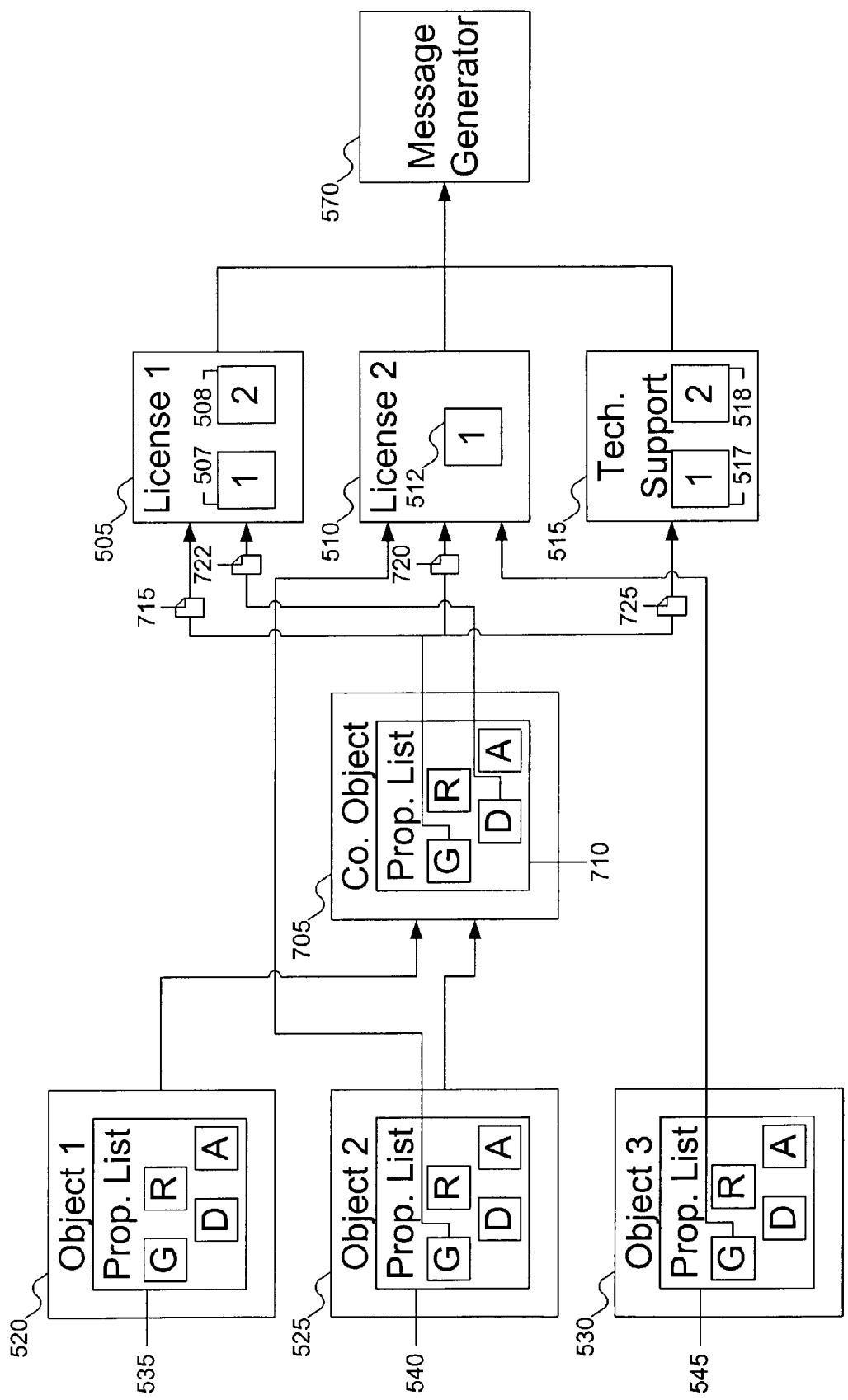
FIG. 7 shows objects in the container hierarchy of FIG. 2 accessing properties of resources via the computer of FIG. 1, according to an alternative embodiment of the invention.

FIG. 7 shows objects in the container hierarchy of FIG. 2 accessing properties of resources via the computer of FIG. 1, according to an alternative embodiment of the invention. In FIG. 7, rather than associating the properties with the user objects, the properties are associated with company object 705. Company object 705 then includes property list 710, which identifies all of the properties to which the company is granted access, denied access, requested access, and voluntarily associated. Company object 705 also stores lists of which users are to be granted and denied access to the various properties of the resources. These lists are shown as lists 715, 720, 722, and 725. Thus, for example, list 715 indicates that user object 520 is granted access to property 507 of resource 505, list 720 indicates that no users are granted access to property 512 of resource 510, list 725 indicates that user objects 520 and 525 are granted access to property 517 of resource 515, and list 722 indicates that user object 525 is denied access to property 508 of resource 505.

Note that user objects 520, 525, and 530 still have their own property lists. It can happen that users have the right to access properties of resources independently of any company affiliation they might have. Such property access would still be controlled by property lists 535, 540, and 545, respectively.

Figure 8A:
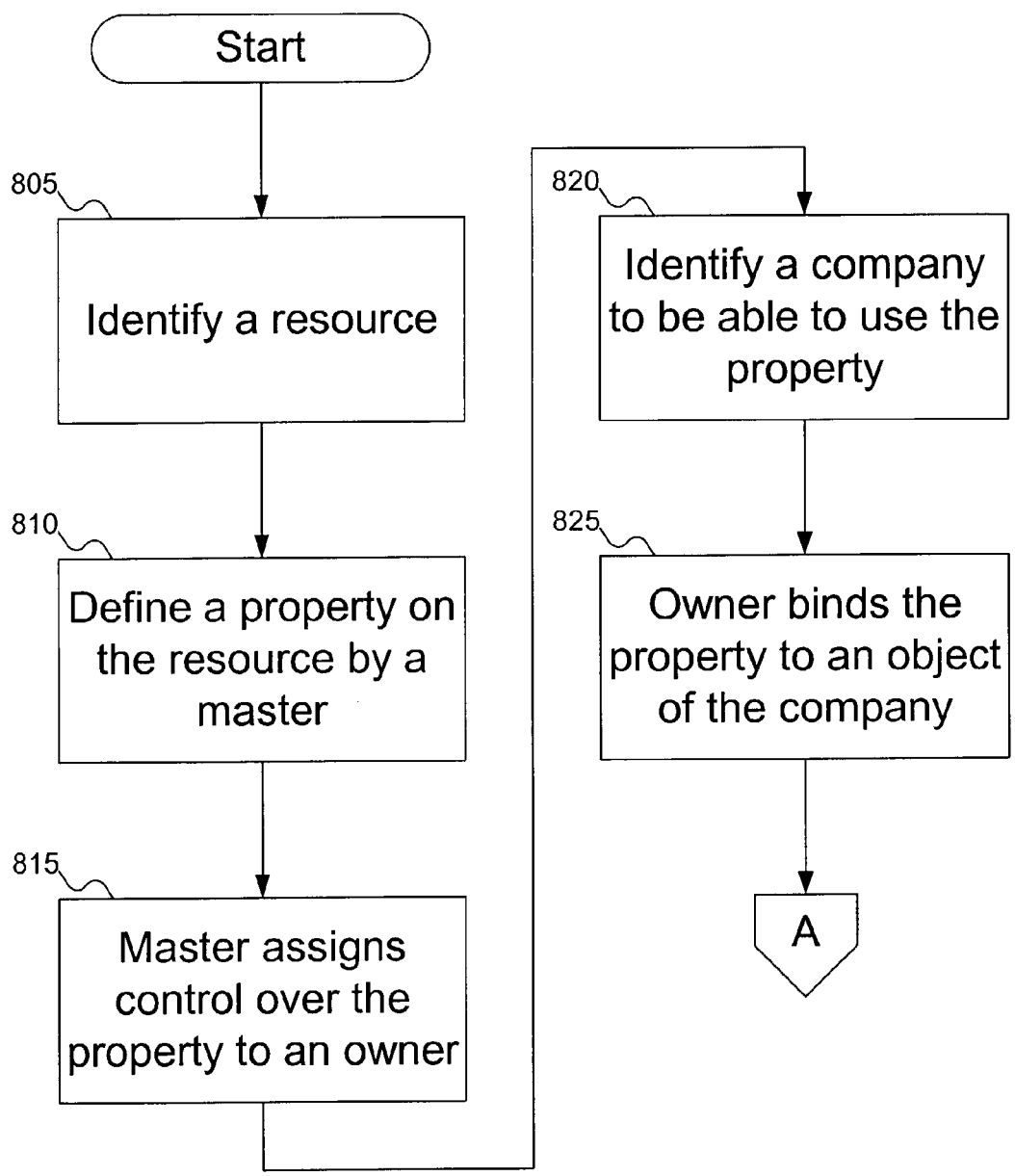
FIGS. 8A-8B show a flowchart of the procedure for performing distributed administration of resources in the computer of FIG. 1, according to an embodiment of the invention.
Figure 8B:
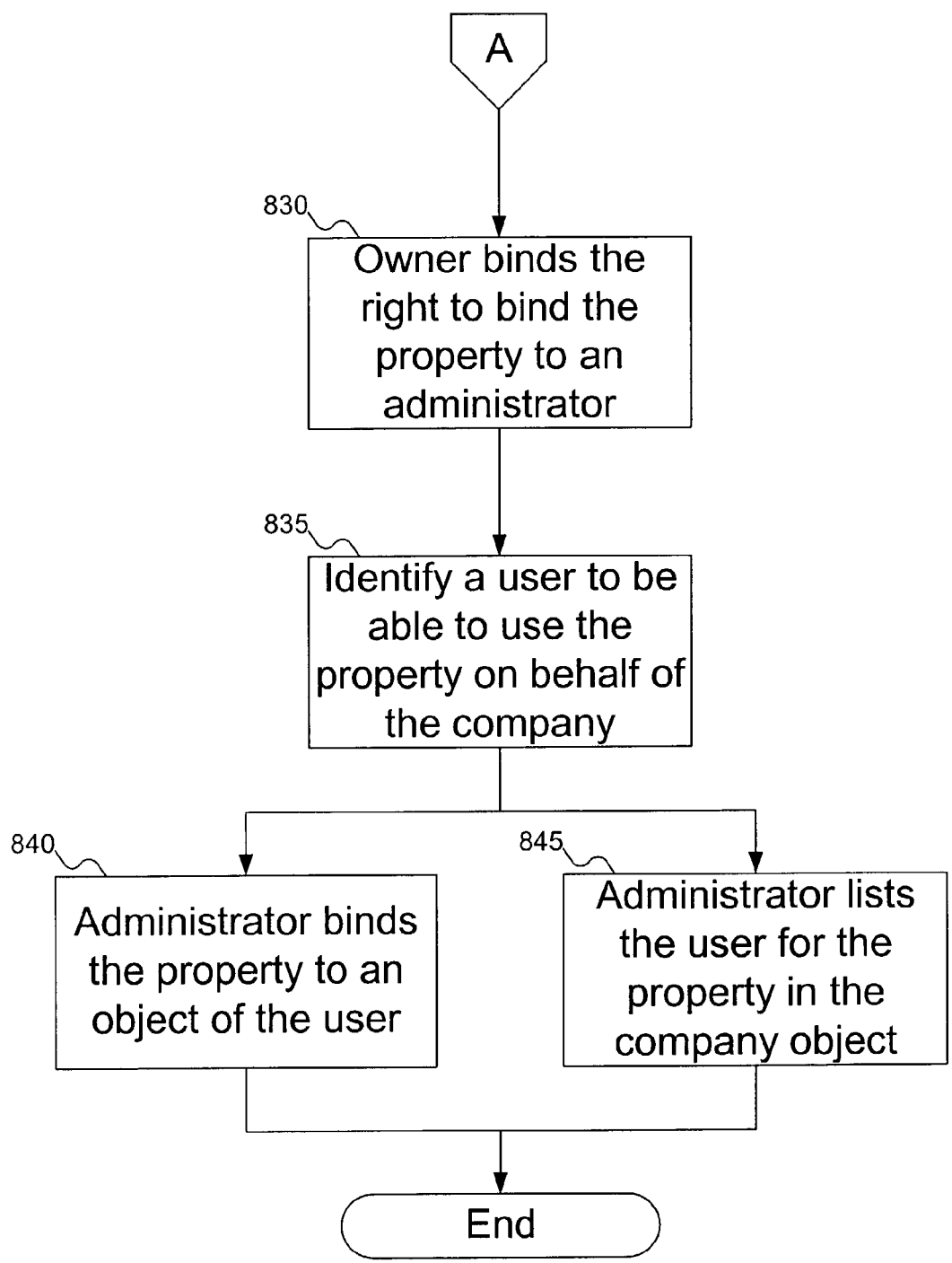

FIGS. 8A-8B show a flowchart of the procedure for performing distributed administration of resources in the computer of FIG. 1, according to an embodiment of the invention. In FIG. 8A, at step 805, a resource is identified. At step 810, a property is defined on the resource by a master. At step 815, the master assigns control over the resource property to an owner. At step 820, a company able to use the property is identified. At step 825, the owner associates the property to a company object.

At step 830 (FIG. 8B), the owner associates the right to associate the property to an administrator for the company. As described above, this can be accomplished by setting the administrator attribute within a user object associated with the company to the value of the property in question. At step 835, the administrator identifies a user who is to be able to use the property. The user is then granted access to the property. This can be done in one embodiment at step 840 by associating the property to the user object. Alternatively, the user can be granted the property by listing the user as having access to the property within the company object.

Although FIGS. 8A-8B describe how a user can be granted access to a property, a person skilled in the art will recognize that many of the steps can be changed to add the property to a different property sub-list. For example, if the user is to be denied access to a property, then steps 840 or 845 can be changed to add the property to the denied sub-list rather than the granted sub-list.

Figure 9A:
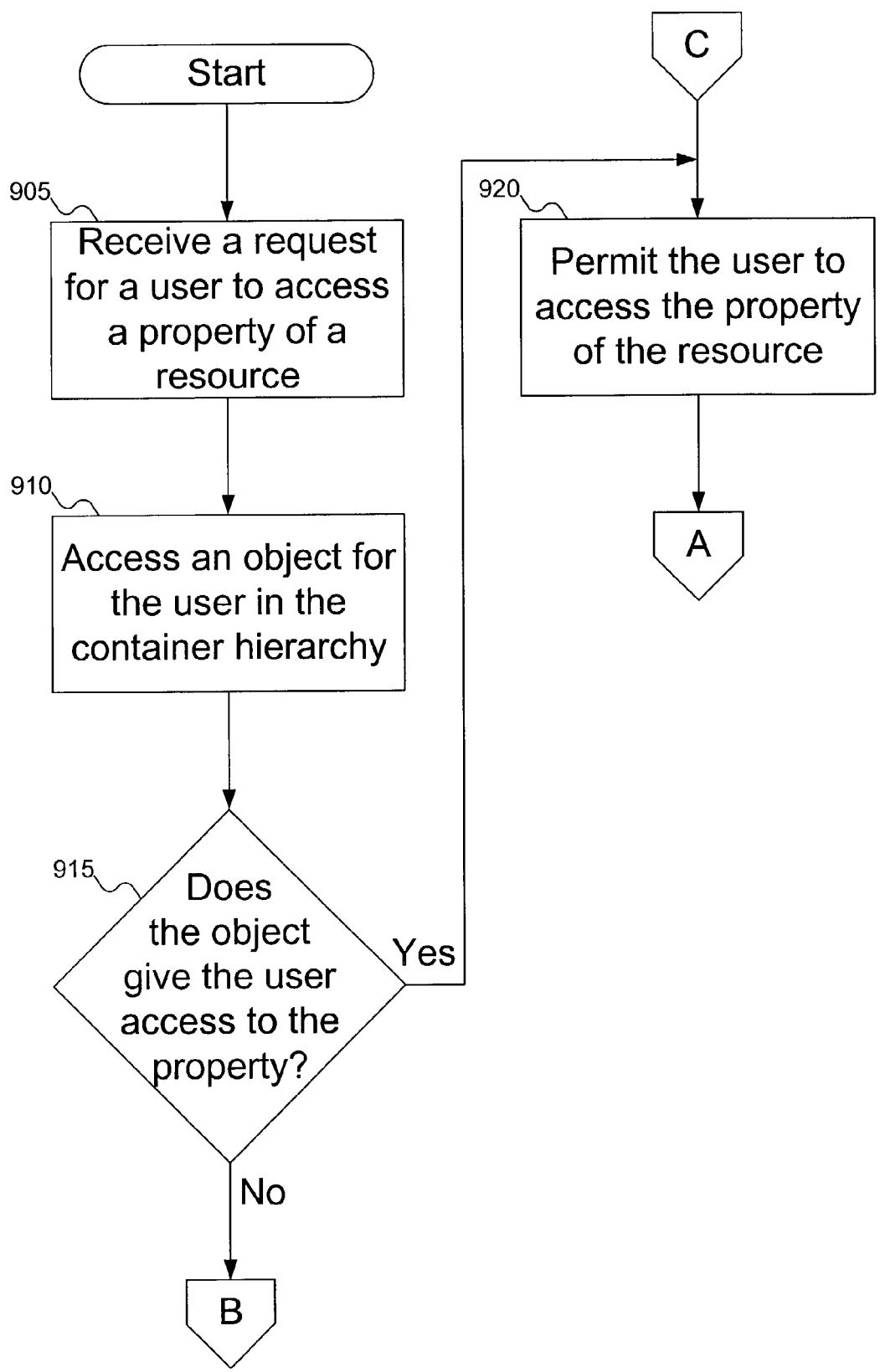
FIGS. 9A-9B show a flowchart of the procedure for permitting a user to access a property of a resource in the computer of FIG. 1, according to an alternative embodiment of the invention.
Figure 9B:
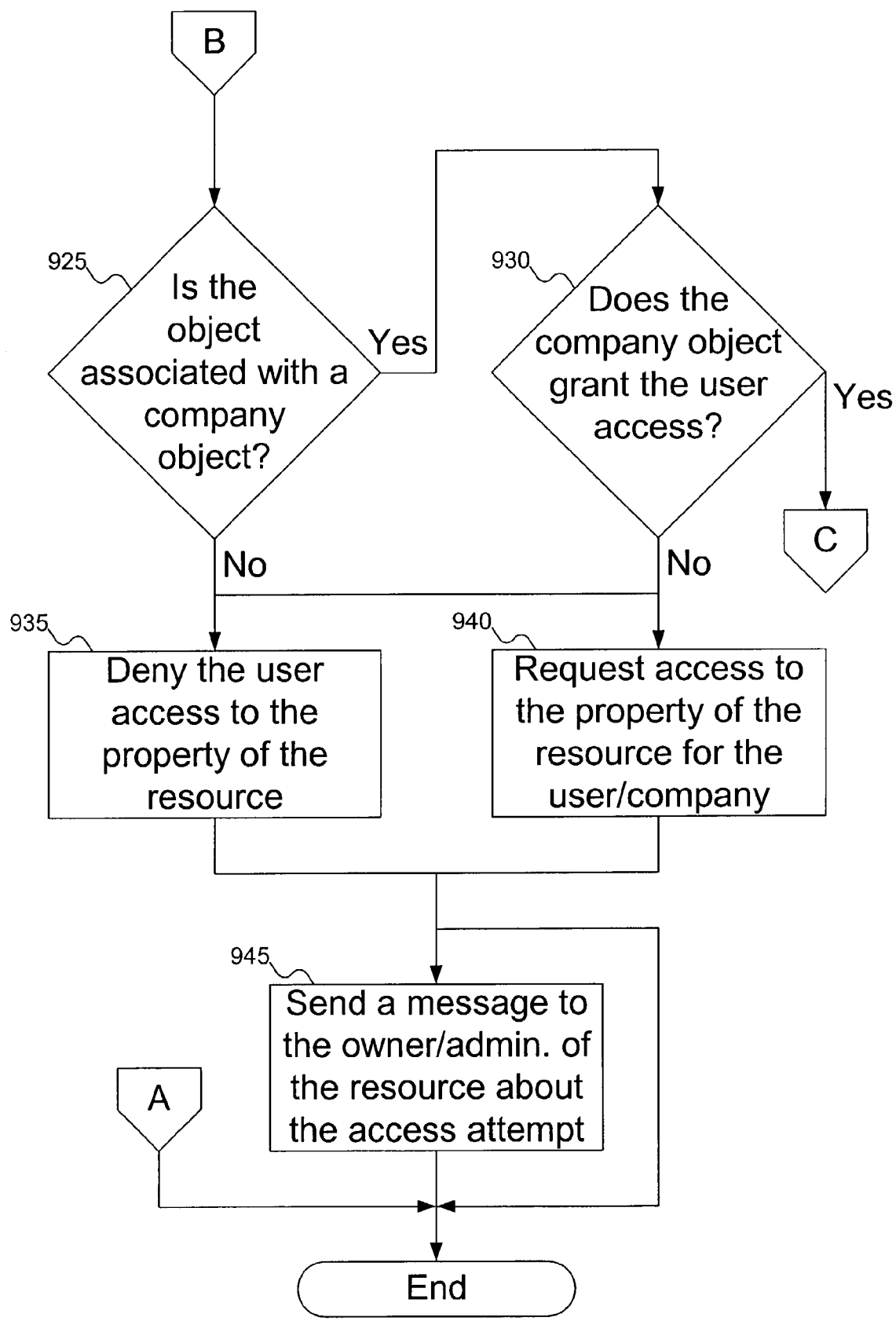

FIGS. 9A-9B show a flowchart of the procedure for permitting a user to access a property of a resource in the computer of FIG. 1, according to an alternative embodiment of the invention. The procedure shown in FIGS. 9A-9B only applies where the users to be granted/denied access to a property are identified within the company object, as shown in FIG. 7. (If the property is stored in a sub-list of the user object as shown in FIG. 5, the procedure for determining access is straightforward.) In FIG. 9A, at step 905, the system receives a request for a user to access a property of a resource. At step 910, the system accesses the appropriate user object. At step 915, the system determines if the user object grants the user access to the property. If so, then at step 920 the user is granted access to the property of the resource.

If the user object does not directly grant the user access to the property of the resource, then at step 925 (FIG. 9B) the system checks to see if the user object is associated with a company object. If so, then at step 930 the system checks to see if the company object grants the user access to the property. If both steps 925 and 930 return positive results, the processing continues at step 920 (where the user is granted access to the property of the resource). If either of steps 925 and 930 returns a negative result, then at step 935 the user is denied access to the resource. Alternatively, at step 940, a request for access to the property of the resource can be made on behalf of the user and/or the company from the owner of the property of the resource. Finally, at step 945, a message can be sent to the owner or administrator of the property of the resource, informing the owner/administrator of the access attempt. A person skilled in the art will recognize that step 945 can be omitted, if desired, or that the message can be directed to another recipient, e.g., the master of the resource.

A person skilled in the art will recognize that an embodiment of the invention described above can be implemented using a computer. In that case, the method is embodied as instructions that make up a program. The program may be stored on computer-readable media, such as floppy disks, optical discs (such as compact discs), or fixed disks (such as hard drives), and can be resident in memory, such as random access memory (RAM), read-only memory (ROM), firmware, or flash RAM memory. The program as software can then be executed on a computer to implement the method. The program, or portions of its execution, can be distributed over multiple computers in a network.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. An apparatus to perform distributed administration, comprising:
a computer;
a container hierarchy defined in the computer;
a master object in the container hierarchy;
an owner object in the container hierarchy;
a first object in the container hierarchy;
a resource;
a property for the resource, defined by a master user identified by the master object;
an administrator object in the container hierarchy, the administrator object flagged as an administrator of a company identified by the first object;
a second object in the container hierarchy;
an associator to associate the property with the first object by an owner user identified by the owner object and to associate the property with the second object by an administrator user identified by the administrator object; and
a message generator to send a message to the administrator user if a user associated with the second object attempts to access the resource.

2. An apparatus according to claim 1, wherein the associator is operative to associate a right to (associate the property) with the owner object by the master user.

3. An apparatus for performing distributed administration, comprising:
a computer;
a container hierarchy defined in the computer;
a resource;
a property defined for the resource;
an administrator object in the container hierarchy, the administrator object associated with a right to (associate the property to a second object) in the container hierarchy;
an owner object in the container hierarchy, the owner object responsible for associating the right to (associate the property) to the administrator object; and
a master object in the container hierarchy, the master object responsible for defining the property, wherein the master object is responsible for defining the property and for associating a right to (associate the right to (associate the property)) to the owner object.

4. An apparatus according to claim 3, further comprising:
a client, the client responsible for using the resource; and
a network connecting the resource, the computer, and the client.

5. An apparatus according to claim 3, wherein:
the administrator object includes a company object; and
the apparatus further comprises an administrator user object associated with the company object.

6. A computer-implemented method for performing distributed administration, comprising:
identifying a resource;
defining a property on the resource by a master of the resource;
associating the property with a first object in a container hierarchy by an owner of the resource, wherein associating the property includes associating the property with a company object in the container hierarchy;
associating the property with a second object in the container hierarchy by an administrator of a company associated with the company object; and
associating the company object with a user object by the administrator.

7. A computer-implemented method for performing distributed administration, comprising:
identifying a property for a resource by a master object in a container hierarchy;
associating a right to (associate a right to (associate the property for the resource)) to an owner object in the container hierarchy by the master object; and
associating the right to (associate the property for the resource) to an administrator object in the container hierarchy; and
associating the property for the resource to a user object in the container hierarchy by the administrator object.

8. Computer-readable media containing a program executed by a computer to perform distributed administration, the program comprising:
software to identify a resource;
software to identify a property on the resource by a master of the resource; and software to associate the property with a first object in a container hierarchy by an owner of the resource and to associate the property with a company object in the container hierarchy;

software to associate the property with a second object in the container hierarchy by an administrator of a company associated with the company object; and software to associate the company object with a user object by the administrator.

9. Computer-readable media containing a program executed by a computer to perform distributed administration, the program comprising:

software to identify a property for a resource by a master object in a container hierarchy;

software to associate a right to (associate a right to (associate the property for the resource)) to an owner object in the container hierarchy by the master object; and software to associate the right to (associate the property for the resource) to an administrator object in the container hierarchy;

software to associate the property for the resource to a user object in the container hierarchy by the administrator object.

* * * * *